United States Patent [19]

Skaggs

[11] 4,019,472
[45] Apr. 26, 1977

[54] WATER INJECTION DEVICE FOR INTERNAL COMBUSTION ENGINES

[76] Inventor: William Dale Skaggs, 1572 Belle St., San Bernardino, Calif. 92404

[22] Filed: Feb. 9, 1976

[21] Appl. No.: 656,437

Related U.S. Application Data

[63] Continuation-in-part of Ser. No. 522,029, Nov. 8, 1974, Pat. No. 3,955,542.

[52] U.S. Cl. .............................. 123/25 L; 137/544
[51] Int. Cl.² ...................................... F02D 19/00
[58] Field of Search ............ 123/25 R, 25 A, 25 L, 123/25 B; 137/515, 511, 544

[56] References Cited

UNITED STATES PATENTS

| | | | |
|---|---|---|---|
| 1,397,780 | 11/1921 | Pohl .................. | 123/25 L |
| 1,472,438 | 10/1923 | Rader ................. | 123/25 L |
| 1,532,638 | 4/1925 | Rodgers ............... | 123/25 L X |
| 1,613,789 | 1/1927 | Devary ................ | 123/25 L |
| 1,632,772 | 6/1927 | Bijur ................. | 137/544 |
| 1,750,632 | 3/1930 | Farmer ................ | 137/544 X |
| 1,844,099 | 2/1932 | Meier ................. | 137/544 X |
| 2,570,369 | 10/1951 | Murray ................ | 137/544 X |
| 3,875,922 | 4/1975 | Kirmiss ............... | 123/25 R X |
| 3,955,542 | 5/1976 | Skaggs ................ | 123/25 L |

Primary Examiner—C. J. Husar
Assistant Examiner—Ira S. Lazarus
Attorney, Agent, or Firm—William C. Babcock

[57] ABSTRACT

An improved device having no moving parts which, when in communication with the air intake of a carburetor of an internal combustion engine injects a mist of water into the air-fuel mixture formed by the carburetor, which water when in the zone of combustion in the engine reacts with carbon monoxide and free carbon therein to form carbon dioxide and hydrogen. The hydrogen so formed reacts with oxygen in the air-fuel mixture to form water that is either discharged in the exhaust from the engine or reacts with additional carbon dioxide and carbon in the zone of combustion to produce further carbon dioxide and hydrogen that continues until the carbon dioxide and water are discharged in the exhaust from the engine. The device when operating not only lowers the content of carbon monoxide in the exhaust discharged from the engine, but also tends to remove and minimize the depositing of carbon on spark plugs and in the cylinders of the engine.

3 Claims, 3 Drawing Figures

WATER INJECTION DEVICE FOR INTERNAL COMBUSTION ENGINES

CROSS-REFERENCE TO RELATED APPLICATION

The present application is a continuation-in-part of my application Ser. No. 522,029, filed on Nov. 8, 1974, which is Pat. No. 3,955,542, entitled "WATER INJECTOR VALVE AND REGULATOR".

BACKGROUND OF THE INVENTION

1. Field of the Invention

Improved water injection device for internal combustion engines.

2. Description of the Prior Art

For many years it has been realized that internal combustion engines run more smoothly and operate more efficiently in the evening than during the day. This improved performance of an internal combustion engine in the evening is due to the increased moisture content of the air that mixes with the fuel in the carburetor, and this moisture in the form of water vapor reacting with carbon monoxide and free carbon in the zone of combustion in the engine impart improved operating characteristics to the engine by providing more complete combustion of the fuel.

From time to time in the past, various devices have been used in an attempt to add water to the air fuel mixture of an internal combustion engine in an attempt to reproduce the conditions that occur naturally in the evening or night when an engine is operated. These devices, with the exception of the one shown in my co-pending application Ser. No. 522,029, have the operational disadvantages that they are bulky, unduly complicated, and uncertain in operation. The primary purpose in devising the present invention is to supply a device having no moving parts for automatically injecting a mist of water into the air intake of a carburetor.

Another object of the invention is to supply a device that is of simple structure, can be fabricated from commercially available materials, is easy to install, is automatic in operation and is substantially maintenance free.

A still further object of the invention is to supply a device which when operating and discharging water in the form of a mist into the air intake of a carburetor improves the operation of the engine with which the device is associated by the water in the form of vapor in the zones of combustion reacting with carbon monoxide and free carbon to transform the last mentioned two materials into carbon dioxide and hydrogen, with the hydrogen subsequently combining with oxygen in the air of the air-fuel mixture to form additional water which further reacts with carbon monoxide to provide carbon dioxide and additional hydrogen.

SUMMARY OF THE INVENTION

The improved invention includes a vented reservoir that is disposed a substantial distance below the carburetor, with the reservoir having a first tube that extends downwardly therein to a position adjacent the bottom of the reservoir. The improved invention includes an elongate housing that has first and second end portions, with the first end portion connected to the first tube, and the second end portion secured to the second tube. The second tube is connected to the air intake of the carburetor.

An orifice plate is removably supported in the housing, preferably adjacent the second end thereof. A filter, preferably in the form of an elongate porous tuft, is situated within the interior of the housing downstream from the orifice plate. The filter, while porous, offers substantial resistance to flow of water from the reservoir therethrough. Water flows through the filter to discharge through the orifice plate as a stream of finely divided particles only when the operation of the internal combustion engine causes a substantial negative pressure to develop in the second tube.

The filter serves a three-fold purpose. The filter first removes particles of solid material from the water in the reservoir prior to the water being discharged to the carburetor. Such particles if not removed, can clog the jets of the carburetor to impair the operation of the latter. Secondly, the filter prevents water being discharged from the orifice plate until such time as the operation of the internal combustion engine develops a substantial negative pressure in the second tube. The filter serves a third function, in conjunction with the placing of the reservoir a substantial distance below the carburetor, preventing water discharging to the carburetor when the engine is not operating.

The water vapor when entering the zones of combustion in the engine combine with carbon monoxide and free carbon to form carbon dioxide and hydrogen, which hydrogen subsequently combines with oxygen in the air-fuel mixture in the combustion zone to form water.

The water so formed again combines with carbon monoxide and free carbon to reproduce the cycle above described, until such time as the water so formed is discharged from the engine as a part of the exhaust therefrom.

The water in transforming the carbon monoxide to carbon dioxide and hydrogen effects a more complete combustion of the air fuel mixture than normally occurs and as a result the engine efficiency is increased and the quantity of pollutants discharged by the engine to the atmosphere being lowered due to at least a portion of the carbon monoxide normally present therein being previously transformed to harmless carbon dioxide.

DESCRIPTION OF THE PREFERRED EMBODIMENT

Figure 1:
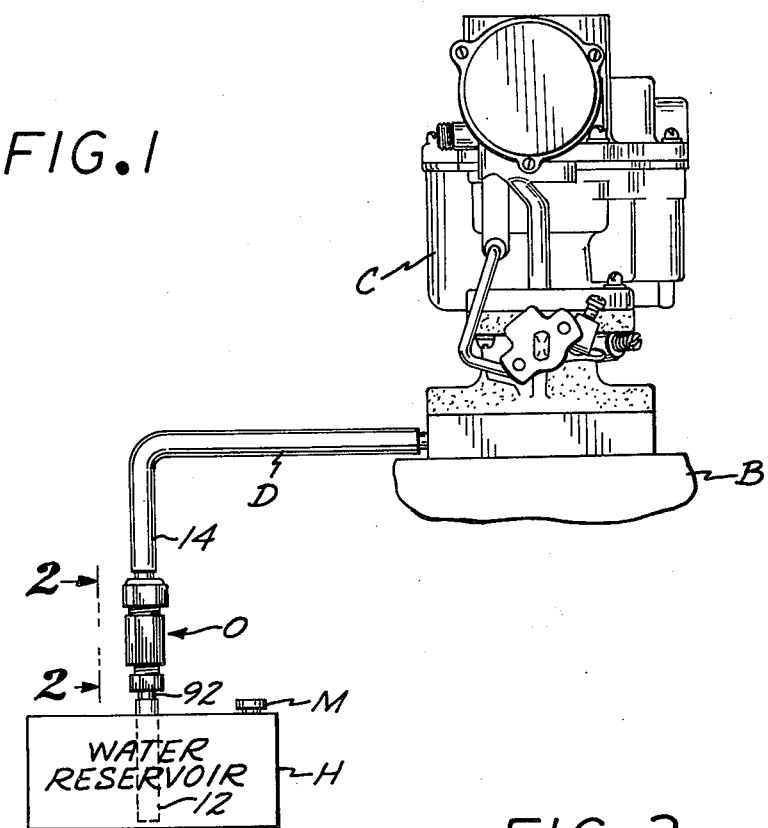
FIG. 1 is a diagrammatic view of the improved invention and illustrates its relative position to the air intake of a carburetor of an internal combustion engine, and the water reservoir used in conjunction with the invention.
Figure 2:
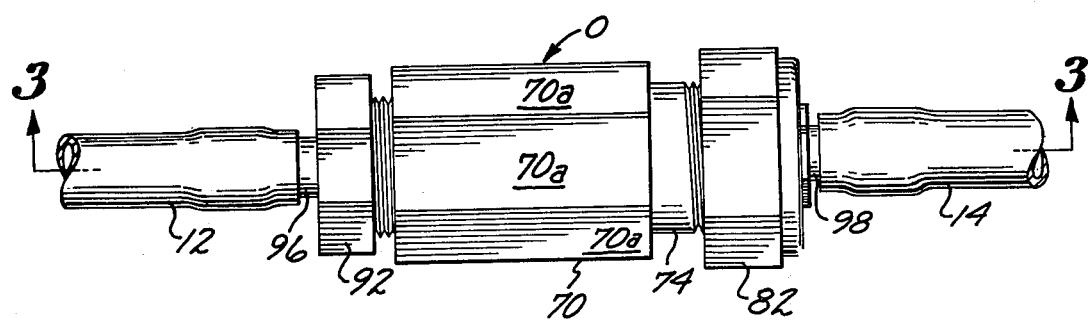
FIG. 2 is a side elevational view of the invention taken on the line 2—2 of FIG. 1.

The invention O, as may be seen in FIG. 1, is used on an internal combustion engine B that has the air intake of a carburetor C connected by a tubular line B to the crankcase of the engine (not shown). A water reservoir H is provided that is mounted a substantial distance below the carburetor C. Reservoir H has a first tube 12 extending from the interior portion thereof to a first end portion of the improved invention O. A second tube 14 extends from a second end portion of the improved invention O to the tube D, which tube D is in communication with the air inlet of carburetor C. When second tube 14 of the improved invention O is subjected to a negative pressure, this decreased pressure results in a mass of water being discharged into the second tube 14 to subsequently mix with the air-fuel mixture in the carburetor and absorb heat from the latter to be transformed into water vapor prior to entering the zones of combustion in the engine B.

The water vapor, upon entering the zones of combustion (not shown) in the engine, combine with carbon monoxide formed therein as well as free carbon that may be present in the zones of combustion to form carbon dioxide and hydrogen. The hydrogen so formed combines with oxygen in the air-fuel mixture to form water and the water so formed again combines with carbon monoxide and carbon to produce additional carbon dioxide and hydrogen. The introduction of the water vapor into the zones of combustion minimizes the quantity of pollutants in the exhaust from the engine due to the carbon monoxide being transformed into carbon dioxide.

Thus, the efficiency of the engine is increased by the discharge of water vapor into the zones of combustion due to the water vapor effecting a more complete combustion of the air-fuel mixture and the water vapor also combining with free carbon that may be disposed on spark plugs or on the interior portion of the engine that defines the zones of combustion to transform such carbon into carbon dioxide that is discharged from the engine.

From the above description it will be seen that the water vapor serves a two-fold purpose, namely, lowering the carbon monoxide content of the exhaust from the engine and increasing the efficiency of the engine by removing free carbon therefrom, as well as effecting a more complete combustion of the air-fuel. The reaction by which water vapor transforms carbon monoxide to carbon dioxide and carbon to carbon dioxide and hydrogen are set forth below:

$$2CO + 2H_2O \rightarrow 2CO_2 + 2H_2$$

$$C + 2H_2O \rightarrow CO_2 + 2H_2$$

Figure 3:
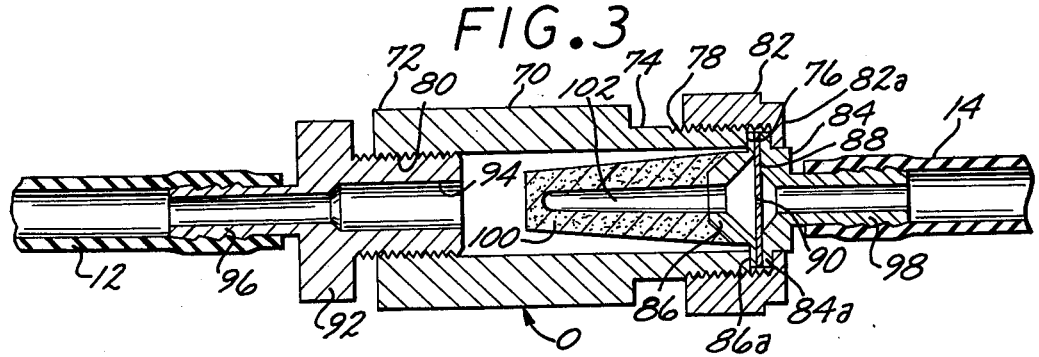
FIG. 3 is a longitudinal cross-sectional view of the improved invention taken on the line 3—3 of FIG. 2.

In detail, the structure of the improved invention O may best be seen in FIG. 3. The improved invention O includes a housing assembly Q that is defined by an elongate cylindrical shell 70 that preferably has a number of circumferentially spaced longitudinally extending, flat surfaces 70a defined on the exterior surface thereof. The shell 70 has a first end portion 72 and second end portion 74. The second end portion 74 terminates in a flat ring-shaped end face 76. The shell 70 has external threads 78 formed on the second end portion 74 thereof, and interior threads 80 defined on the first end portion 72.

An internally threaded ring 82 is provided that has an inwardly extending circumferential lift 82a as may be seen in FIG. 3. First and second apertured members 84 and 86 are provided that have circular flanges 84a and 86a extending outwardly therefrom. The first and second apertured members 84 and 86 are disposed on opposite sides of a circular plate 88 in which a small diameter orifice 90 is defined. The first and second aperatured members, with the plate 88 sandwiched therebetween, are removably held on the shell 70 when the ring 82 is threaded onto the external threads 78. The flanges 84a and 86a are pressure contacted and held in a stationary position relative the shell 70 by being engaged by the lip 82a and the ring-shaped end face 76. The interior threads 80 are engaged by an externally threaded plug 92 that has a longitudinal bore 94 therein. A first tubular boss 96 extends outwardly from the plug 92 and engages the first tube 12 as shown in FIG. 3. A second tubular boss 98 projects outwardly from the first apertured member 84 and engages the second tube 14. An elongate porous cup 100 is provided that is mounted in a longitudinally extending position within the shell 70 and is supported from the second apertured member 86. The elongate porous cup has a confined space 102 therein. The porous cup serves as a filter to remove particles of solid material from the water in reservoir H, prior to the water discharging as a spray of finely divided particles from the orifice 90. If such particles are not removed the orifice 90 may be clogged and the efficiency thereof impaired, as well as such particles entering the jets of the carburetor C to likewise impair their efficient operation. When the engine B starts to operate, a negative pressure develops in the second tube 14, and as a result a negative pressure is impressed within the confined space 102, that causes water to be drawn from the first tube into this confined space. The cup 100, while porous, offers substantial resistance to the flow of water therethrough and as a result, water will not enter the confined space 102 unless negative pressure is developed within the second tube 14.

As negative pressure develops in the second tube 14, water is discharged as a spray of finely divided particles through the aperture 90 to thereafter flow through the second tube 14 and mix with the air-fuel mixture flowing into the carburetor C.

The porous cup 100, in addition to serving as a filter, also prevents the flow of water into the confined space 102 when the engine is not operating and there is no negative pressure developed in the second tube 14. Due to the reservoir 8 being situated a substantial distance below the carburetor C, the porous cup 100 in cooperation with the downwardly extending length of the tube 14, prevents water being siphoned into the carburetor C when the engine is not operating.

The improved invention O provides the same operational advantages of my prior invention A, as described in application Ser. No. 522,029, but has the operational advantage that it is of simpler construction than my previous invention. The previous invention as shown and described in Ser. No. 522,029 is shown in FIG. 4. The invention A as shown in FIG. 4 includes a housing assembly J that is defined by an elongate cylindrical cup 16 that has a first closed end 18 and a second end 20 that is open. The first end 18 has a first tubular boss 21 projecting therefrom, which boss defines a first opening 22 within the interior thereof that is at all times in communication with a confined space 24 within the housing assembly J. The first boss 20 is connected to the first tubular member 12 that extends from the water reservoir H.

The cup 16 has external threads 26 formed thereon adjacent the second open end 20. The threads 26 are removably engaged by threads 28 formed in the interior of a cap 30, which cap has a second tubular boss 32 extending outwardly therefrom. The second boss 32 defines a second opening 34 within the confines thereof. The second boss 32 is connected to the second tubular member 14 as may be seen in FIG. 3.

A plate 36 is removably positioned within the cap 20, with the plate having an orifice 38 formed therein that is at all times in communication with the second opening 34.

A spring loaded valve assembly K is provided and occupies a fixed position in the confined space 24. Valve assembly K includes an elongate valve body 39 that has a first end 40 and a second end 41. An elongate cavity 42 extends into valve body 39 from the second end 41 thereof, with the cavity 42 as it approaches the first end 40 developing into a tapered valve seat 44 that is in communication with a second cavity 46 that extends towards first end 38. The second cavity 46 as it approaches first end 40 intersects a transverse passage 48 formed in the valve body 39. The valve body 39 is of such transverse area that it cooperates with the interior of the cup 16 to define an annulus space 24a therebetween as best seen in FIG. 3. The interior of the first cavity 42 has threads 50 formed therein, that engage threads 52 formed on an outwardly extending portion of a ring shaped flange 54.

The valve body 39 and the plate 36 are held in a fixed position in the assembly J when the cap 30 is threaded onto the cup 16, with the second end 20 of the cup 16 and the cap 30 then removably gripping the flange 54 and plate 36 therebetween as can be best seen in FIG. 3. A ball 58 of greater diameter than the second cavity 46 is situated in the first cavity 42, and the ball at all times being urged into sealing contact with seat 44 by a compressed helical spring 60. The spring 60 has a first end 60a in abutting contact with the aperture defining plate 36. A porous membrane 62 in the form of a cylindrical shell extends around the exterior surface of the valve body 36, and is illustrated in FIG. 3 as extending between the flange 54 and a circumferentially extending rib 39a formed on the valve body 39 adjacent the first end 40 thereof. The membrane 62 defines pores 62a therein that are of smaller cross section than that of the aperture 38 to be certain that solid particles (not shown) that may be entrained in the water (not shown) from the reservoir H will be trapped on the exterior surface of the membrane, and will not pass to positions where the foreign particles can obstruct the orifice 38. Water flows into tube 12 by gravity as may be seen in FIG. 1. The reservoir H on the upper portion thereof is provided with a vented water filling assembly M of conventional design.

The use and operation of both the prior invention A and improved O have been described in detail and need not be repeated.

I claim:

1. In combination with an internal combustion engine that has a carburetor with an air intake, which carburetor delivers an air-fuel mixture to said engine, a device for supplying water in the form of minute globules to said air-fuel mixture when said engine is operating to lessen the content of carbon monoxide in the exhaust from the engine, said device including:

a. a vented reservoir for water;
 b. a first tube connected to the interior of said reservoir, said first tube having a first free end portion;
 c. an elongate hollow housing that has first and second ends;
 d. first apertured means that connect said first free end portion to said first end of said housing;
 e. a second tube connected to said air intake of said carburetor, said second tube having a second free end;
 f. an orifice defining plate transversely disposed adjacent said second end of said housing;
 g. second apertured means that connect said second end to said second end portion of said housing and hold said orifice defining plate at a fixed position relative to said housing; and
 h. an elongate porous cup that is supported from said second means and extends into the interior of said housing, said cup, second means and orifice defining plate cooperating to provide a confined space, said cup of such porosity that water will flow into said confined space and then discharge from said orifice as a stream of said globules only when said engine is operating to impress a negative pressure in said second tube, said cup serving as a filter to remove solid particles from water in said reservoir that might clog said orifice prior to said water entering said confined space, said cup tending to prevent water from said reservoir flowing to said air intake when said engine is not operating, and said confined space serving as storage for a body of filtered water that is immediately available to be formed into said globules when said engine is started and said second tube has a negative pressure therein.

2. A device as defined in claim 1 in which said first tube is formed from a resilient material and said first end of said housing has internal threads thereon, and said first apertured means including:

i. an externally threaded plug that engages said internal threads, said plug including a first outwardly extending protuberance that is engaged by said first end portion of said first tube, and said plug and first protuberance having a passage that extends longitudinally therethrough.

3. A device as defined in claim 1 in which said second tube is formed from a resilient material and said second end of said housing has external threads thereon, and said second apertured means including:

i. first and second apertured members that have said orifice defining plate disposed therebetween, said first apertured member in abutting contact with said second end of said housing, said first apertured member supporting said porous cup in said housing, said second apertured member including a second protuberance that extends outwardly and is engaged by said second end portion of said tube, said second apertured member and second protuberance having a passage that extends longitudinally therethrough; and
 j. an internally threaded ring that engages said external threads on said housing, said ring including an inwardly extending circular lip that engages said second apertured member, and said ring removably supporting said first and second apertured member, said orifice defining plate and said cup as an assembly on said housing.

* * * * *